Nov. 23, 1971  D. MEREDITH  3,621,672

PRESSURE COOLING APPARATUS

Filed June 1, 1970  3 Sheets-Sheet 1

INVENTOR.
DIVEN MEREDITH
BY
Lyon & Lyon
ATTORNEYS

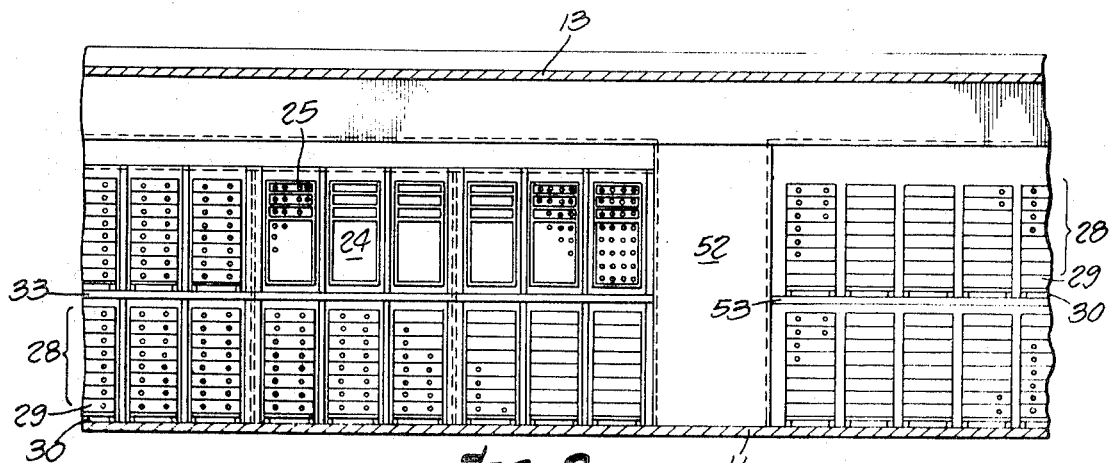
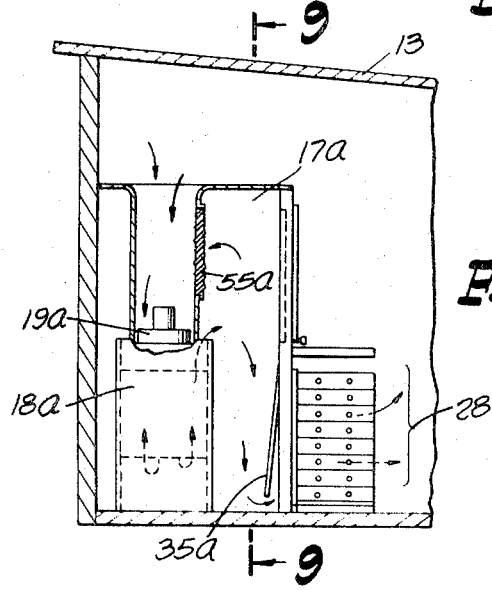
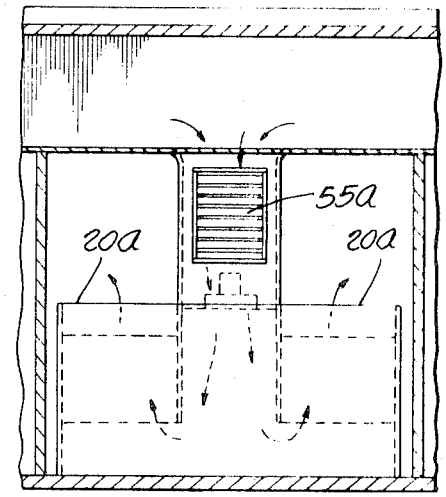
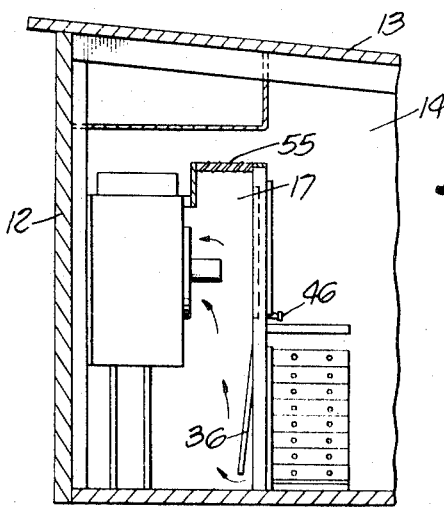

INVENTOR.
DIVEN MEREDITH
BY Lyon+Lyon
ATTORNEYS

United States Patent Office 3,621,672
Patented Nov. 23, 1971

3,621,672
PRESSURE COOLING APPARATUS
Diven Meredith, 87-135 Ave. 56,
Thermal, Calif. 92274
Filed June 1, 1970, Ser. No. 41,931
Int. Cl. F25d 27/00
U.S. Cl. 62—237          14 Claims

ABSTRACT OF THE DISCLOSURE

Apparatus for cooling produce such as fresh vegetables or fruits includes a refrigerated enclosure having a barrier wall provided with a series of groups of openings. The produce is confined in apertured containers stacked on pallets and each is moved by a fork truck into lateral engagement with the barrier wall. The pallets are supported in two tiers. Flexible seals on the barrier wall encompass the openings and engage the apertured containers on one side. A fan causes air to move in a circuit including the apertured containers, the openings in the barrier wall, and through a cooler-humidifier to cool the produce. The proximity of the stack or pallet opens an air valve which otherwise blocks flow of air through the wall openings adjacent the stack.

---

This invention relates to apparatus for achieving optimum operating conditions of forced convection heat transfer wherein load units are individually coupled to an air circuit in a manner which requires only the placing of each load unit in front or, and against, a valved opening connected to a constant pressure air handling system. More particularly, this invention finds particular usefulness in relation to apparatus for cooling and humidifying freshly harvested produce such as, for example, fruits and vegetables. It is the nature of all freshly harvested produce, at ambient temperatures, to deteriorate rapidly, sometimes within a matter of hours. The post-harvest function of pre-conditioning and cold storage is designed to gain time so that the sensitive produce may be delivered to the consumer in a fresh and attractive condition. While the natural decline that sets in immediately upon harvesting cannot be completely stopped, it can be very materially retarded. The effort of post-harvest activities is to increase the time available to maintain an orderly harvesting, storage, transportation and marketing program. A significant link in this chain of activities is the lapse of time between the moment of harvest until controlled cooling has been achieved. It has been said that, as a rule of the thumb, every hour saved from the moment of harvest to removal of field heat can add a day to the useful shelf-life of the product. Accordingly, there is a present trend toward installation of cooling facilities located at the point of harvest. Rapid cooling of the produce is designed to match the rate of harvesting and to cool the produce in the matter of several hours or less.

Present day cooling of produce is carried out in a number of ways. "Body Icing" in water resistant containers is probably the oldest form of cooling and still occupies a very significant place, particularly for the short haul of sweet corn, celery, radishes, etc. "Hydro-Cooling" by direct contact with cold water is easily the fastest form of cooling, usually done before packaging. "Room Cooling" is the slowest form of cooling, usually requiring a product to be stored one or more days, thereby requiring a facility of considerable physical size. Its most common use is in those facilities which handle the more durable and slower moving products and where it is necessary to combine the storage and cooling operation at the point of harvest. "Vacuum-Cooling" is in general use for cooling pre-packed leafy products such as lettuce, broccoli, celery, etc. Head lettuce, as presently handled in non-ventilated containers, is a very difficult product to cool rapidly by other means, even though there is a 3 to 4 percent weight loss inherent in the vacuum-cooling process. "Blast Cooling" is the least used form of cooling, primarily due to the high handling costs involved. Essentially it comprises a stream of cold air directed into the open top of a container.

The present invention relates to "Pressure Cooling" or "Forced Air Cooling." This is a very fast form of cooling, often on the order of one or two hours, accomplished by a positive forcing of air at pressures of 1/3" to 1" water, static pressure, through stacks of palletized cartons or bulk bins of produce. Generally speaking, the unit size of the loads being cooled closely matches the capacity of the carrier being used to transport the cooled produce; commonly the capacity is on the order of 10,000 pounds to 25,000 pounds per load. The physical size of the plant required is on the order of one-third to one-fourth of that of an equivalent "Cold Room" type of plant and may be complete with all loading and refrigerating facilities for fast produce movement.

Accordingly, it is an important object of this invention to provide improved cooling apparatus for removing the field heat under controlled conditions, with a minimum of elapsed time after harvesting. Another object is to provide such cooling apparatus which enables the produce to be cooled by air having a relative humidity on the order of 95 percent or more. High humidity levels, without free moisture, can be automatically maintained by cooling the air in direct contact with chilled water through the use of an efficient contact medium.

Other and more detailed objects and advantages will appear hereinafter.

In the drawings:

FIG. 2 is a sectional view taken substantially on the lines 2—2 as shown in FIG. 1.

FIG. 7 is a sectional detail similar to a portion of FIG. 1, showing a modification.

FIG. 8 is a sectional detail similar to FIG. 1 showing a second modification.

FIG. 9 is a fragmentary elevation taken substantially on the lines 9—9 as shown in FIG. 8.

Figure 1:
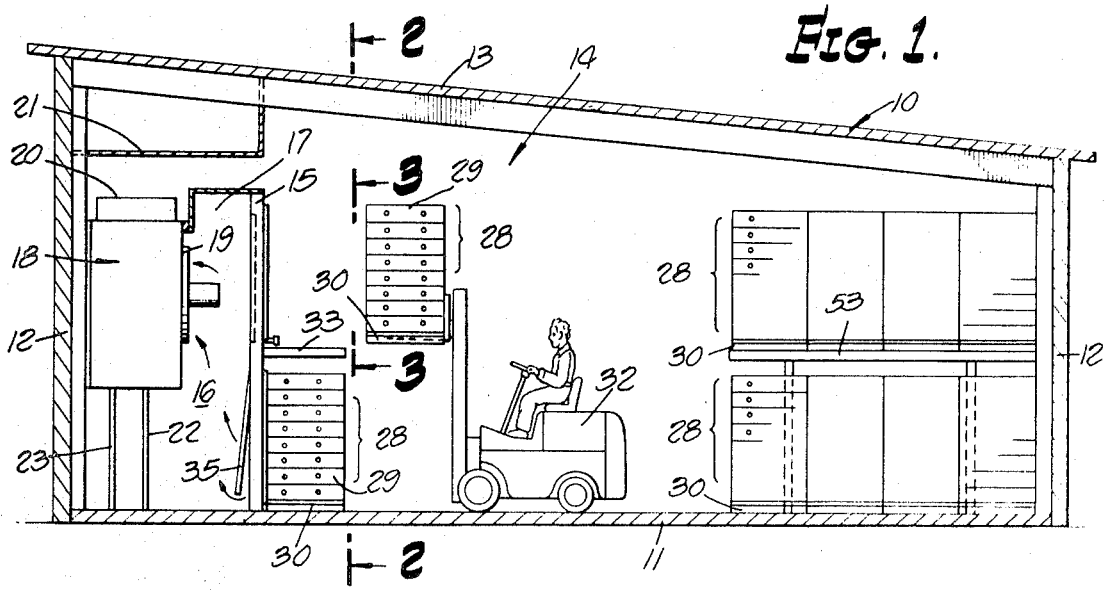
FIG. 1 is a transverse sectional view through a refrigerated building, and showing a preferred embodiment of this invention in diagrammatic form.
Figure 3:
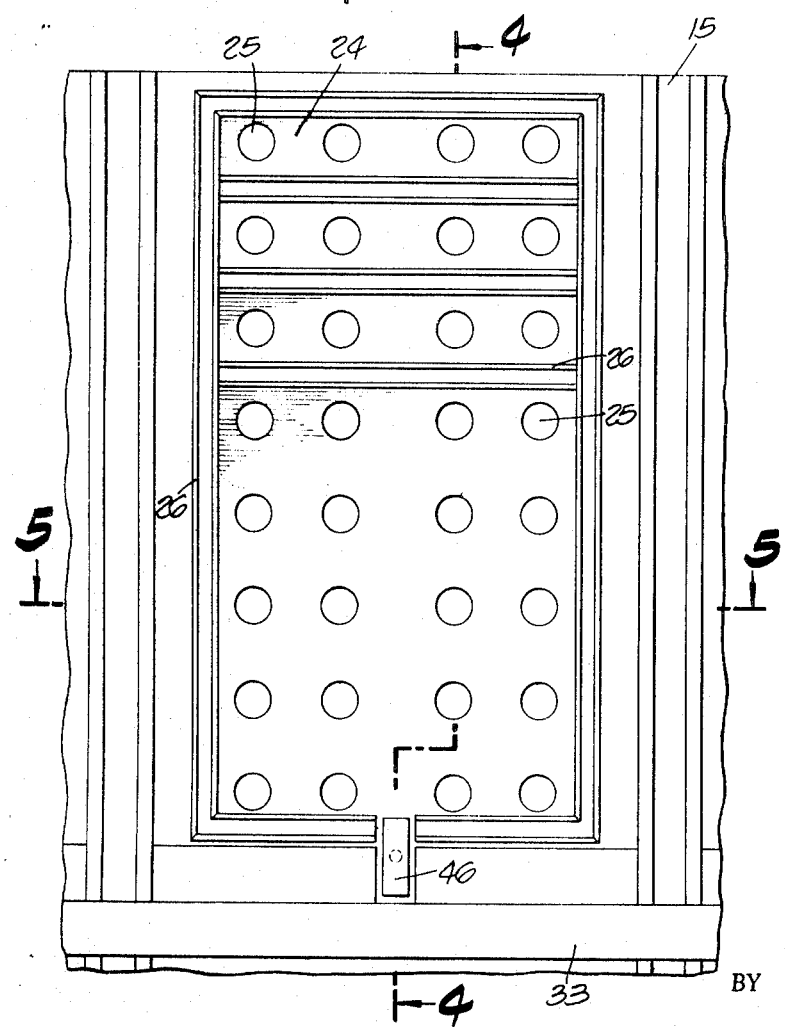
FIG. 3 is a front elevation taken substantially on the lines 3—3 as shown in FIG. 1, and showing the upper one of a pair of cooling units embodying this invention.

Referring to the drawings, the refrigerated building generally designated 10 includes a floor 11, walls 12 and ceiling 13 defining an enclosure 14. A barrier wall 15 is positioned within the enclosure 14 and defines with one of the side walls 12 and separator walls 16 a series of plenum chambers 17. Refrigeration means generally designated 18 are positioned within each of the plenum chambers, and this means preferably comprise a device of the type shown in my prior Pat. No. Re. 26,560 granted Apr. 15, 1969. A power driven suction fan 19 draws air from the interior of its respective plenum chamber 17 and causes it to pass upward through a plurality of groups of tensioned horizontal filaments disposed in vertically spaced relation while previously cooled water drips downward from one filament to the next. The air as thus cooled and humidified passes from the air outlet 20 and under the duct 21 into the interior portion of the enclosure 14. The water is cooled by any suitable refrigerating apparatus, not shown, and reaches the cooling unit 18 through inlet pipe 22 and returns through outlet pipe 23.

For each plenum chamber 17 the barrier wall 15 is provided with a plurality of panels 24 having openings 25 through which air may pass from the enclosure 14 into the plenum chamber 17. Flexible sealing ribs 26 are mounted on each panel 24 and project into the enclosure 14 and encompass each of the groups of openings 25. The rectangular outline formed by the flexible sealing ribs 26 is shaped to conform to the size and shape of the stack 28 of apertured containers 29 mounted on each pallet 30. A manually operated fork lift truck 32 of conventional design rolls on the floor 11 and is used to place stacks 28 adjacent the barrier wall 15 in two tiers, and to bring one side of each stack against one of the panels 24 and with the apertured containers 29 in engagement with the flexible sealing ribs 26. The lower tier of stacks 28 rests on the floor 11 and the upper tier rests on guide supports 33.

Figure 4:
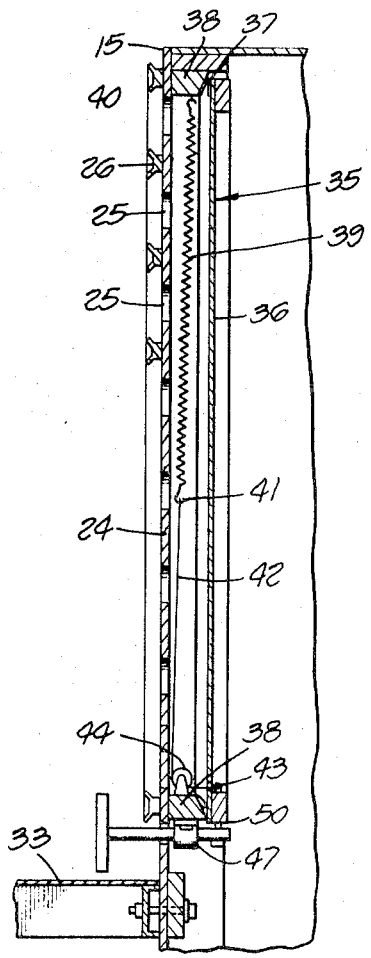
FIG. 4 is a sectional elevation taken substantially on the lines 4—4 as shown in FIG. 3.
Figure 6:
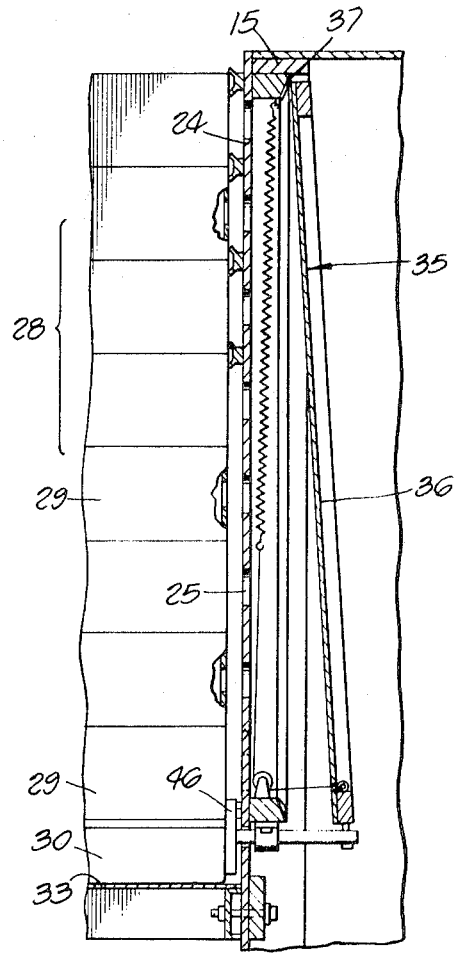
FIG. 6 is a sectional plan view taken substantially on the lines 6—6 as shown in FIG. 2.
Figure 5:
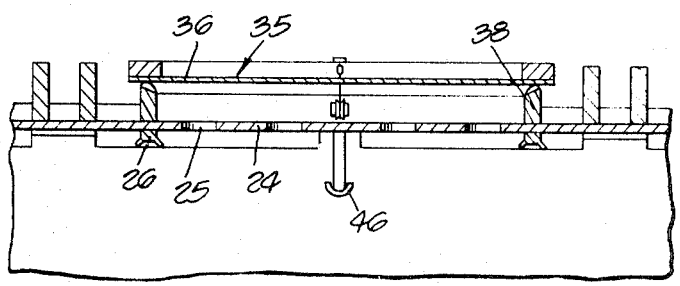
FIG. 5 is a sectional view similar to FIG. 4, showing the air valve device in open position.

A combined barometric damper and air valve device is provided to impede flow of air through the panel openings 25 except when a stack of apertured containers is in position adjacent that particular panel. As best shown in FIGS. 4, 5 and 6, the air valve device 35 includes an imperforate valve plate 36 connected to the barrier wall 15 by means of a hinge 37 positioned along its upper edge. The valve plate 36 may be rectangular in shape and its perimeter edges close against a hollow frame 38 fixed to the barrier wall 15 and panels 24. A tension spring 39 has one end 40 fixed to the hollow frame 38 near the hinge 37, and the other end 41 of the spring is connected by a flexible cable 42 to a fitting 43 attached to the lower swinging end of the valve plate 36. The line 43 passes under a pulley 44 attached to the hollow frame 38 near the lower swinging end of the valve plate 36. A push bar 46 is slidably mounted within a slide-bearing support 47 fixed to the hollow frame 38 and passes through an aperture 48 in the panel 24. The push bar 46 is provided with a transverse opening which loosely receives a pin 50 secured to the lower swinging end of the valve plate 36. When the stack 28 of apertured containers 29 on pallet 30 is moved into position against the sealing ribs 26, the pallet 30 or the lowermost container 29 in the stack, or both, move the push bar 46 from the position shown in FIG. 4 to the position shown in FIG. 5. This action swings the air valve device 35 to fully open position, so that air may flow through the panel openings 25.

In the apparatus shown in FIGS. 1-6 of the drawings and described above, the suction fan 19 causes a flow of air from the enclosure 14 through the openings in the apertured containers in the stacks 28 and through the openings 25 in the panels 24 forming part of the barrier wall 15. The air is thus drawn into the plenum chambers 17 through the refrigerating and humidifying apparatus 18 and back into the enclosure 14. At any given time one or more of the panels 24 may be "idle" in the sense that there is no adjacent stack 28 being cooled. In this situation, the air valve device adjacent each idle panel 24 is not completely closed, but opens enough against the action of the spring 39 to serve as a barometric damper, allowing a reduced flow of air through the openings 25 as compared to the flow of air in the fully open position, as shown in FIG. 5. This barometric feature of the valve device 35 assures a nearly constant pressure in the plenum chamber 17 so that any number of the openings 25 connected to the plenum chamber are assured of a uniform air pressure, and hence an equal flow of cooling air. This feature is significant because it maintains a constant rate of heat transfer for each stack 28 and thereby maintains an orderly and predictable cooling time for each stack.

In addition to the cooling apparatus 18 positioned within each plenum chamber 17, there is a separate refrigeration unit 52 positioned within the building 10. This refrigerating unit also includes a humidifier, and is preferably of the same general construction as the smaller cooling units 18 within each plenum chamber 17. The function of this cooling and humidifying apparatus 52 is to maintain the temperature and humidity within the enclosure 14 at the desired level, regardless of the number of cooling units 18 which are operating at any given time. The duct 21 delivers cooled and humidified air all along one side of the enclosure 14 near the ceiling 13. Stacks 28 previously cooled against the barrier wall 15 may be stored within the enclosure awaiting shipment. Such stacks are shown resting on the elevated supports 53 and resting on the floor 11 below them.

While the stacks 28 are each illustrated as being mounted on a pallet 30, it will be understood that in some instances the pallets may not be used, and instead a "unit load" or stack of apertured containers may be employed without a pallet. Moreover, the expression "stack of apertured containers" is intended to include an apertured bin.

In operation, the enclosure 14 is first cooled down to the desired operation temperature, for example 34° F., and the desired relative humidity, for example 95 percent. This is accomplished by the refrigerator-humidifier units 18 and 52. Freshly harvested produce such as, for example, strawberries, leafy vegetables, melons, or tree fruit, etc., in apertured containers 29 are arranged in a stack 28 on a pallet 30 and are brought into the enclosure through a door, not shown. The fork truck is then manipulated to position the stack 28 against one of the panels 24 with one side of the stack in engagement with the flexible sealing ribs 26. A stack of maximum height covers all of the openings 25 in the panel, whereas a shorter stack may reach only as high as one of the intermediate horizontal sealing ribs 26. The movement of the pallet 30 and stack 28 into position against the barrier wall 15 serves to operate the push bar 46 to move the valve plate 36 to fully open position, as described above, so that air flows through the apertured containers 29 and through the openings 25 and into the plenum chamber 17. As soon as one stack 28 is in position against the barrier wall 15, the operator of the fork truck 32 brings another stack into the enclosure 14 and moves it to a different position against the barrier wall 15 in the same manner as before. The stacks are placed side-by-side on the floor 11 to form the lower tier and are placed side-by-side on the guide supports 33 to form the upper tier. After the proper amount of time has elapsed, for example about two hours, to remove the field heat from the produce within the stack, and to bring the temperature of the produce near the desired temperature, for example 34° F., the stack is moved away from the barrier wall 15. The spring 39 moves the valve plate 36 toward closed position where it "floats" partly open, the differential pressure balancing the action of the spring 39. The fork truck 32 moves the stack and places it in storage on the other side of the enclosure, either above the elevated supports 53 or below them. The produce remains stacked in storage within the enclosure 14 until sufficient quantity has been accumulated to load refrigerated transport vehicles through another door, not shown.

The labor cost in the operation described is quite low, and as a rule there is no need to handle individual packages.

It will be understood that the forced draft of air through the apertured containers 29 lowers the temperature of the produce at a much more rapid rate than would be the case if the hot produce were simply brought into the cold room and stored.

In the modified form of the invention shown in FIG. 7, a barometric damper 55 is interposed between the plenum chamber 17 and the space 14, and the strength of the coil springs 39 is increased so that the valve plates 36 close tightly around their perimeter unless the push bar 46 is actuated. The air valve devices 35 no longer function as barometric dampers in the idle position, this function being taken over by the damper 55.

In the modified form of the invention shown in FIGS. 8 and 9, the direction of flow of air through the stacks 28 is reversed, so that the air flows from the plenum chamber 17a through the air valve device 35a through the stack 28 and into the space 14. The fan 19a draws air from the space 14, moves it through the cooling and humidifying device 18a, which is of the type previously described, and discharges the air through outlets 20a into the plenum chamber 17a. Air may return from the plenum chamber 17a into the fan inlet through the barometric damper 55a. The positive pressure within the plenum chamber 17a as compared to the space 14 serves to close the air valve devices 35a assisted by the springs 39. The air valve devices 35a are opened only by contact of the stack 28 with the push bar 46. In other respects, this form of the invention is the same as that previously described.

Having fully described my invention, it is to be understood that I am not to be limited to the details herein set forth but that my invention is of the full scope of the appended claims.

I claim:

1. Apparatus for cooling fruit or vegetables or the like, confined in a stack of apertured containers, comprising, in combination: walls forming an enclosure, an upright barrier wall within the enclosure and having a series of openings therein, refrigeration means for cooling the enclosure, said means including a fan assembly whereby air may be moved through the said openings, flexible sealing means on said barrier wall encompassing said openings and projecting into said enclosure and shaped for lateral engagement by the stack of apertured containers, air valve means for impeding air flow through said openings and movable to open position permitting air flow through said openings, and means operated by engagement with the stack for opening the air valve means whereby air is caused to flow through the apertured containers.

2. The combination set forth in claim 1 wherein the means for opening the air valve means is positioned for engagement by a pallet supporting the apertured containers.

3. The combination set forth in claim 1 wherein the fan assembly operates to draw air by suction through said apertured containers and then through said openings.

4. The combination set forth in claim 1 wherein the fan assembly operates to blow air through said openings and then through said apertured containers.

5. The combination set forth in claim 1 wherein the air valve means comprises a valve plate supported by a hinge.

6. The combination set forth in claim 1 wherein a plurality of barrier walls are provided in side-by-side relation, each with a series of openings therein, so that a plurality of stacks may be cooled simultaneously.

7. The combination set forth in claim 1 wherein a plurality of barrier walls are provided, one above the other, each with a series of openings therein, and a support surface adjacent the lower part of each barrier wall, whereby a plurality of stacks, each resting on one of the support surfaces, respectively, may be cooled simultaneously.

8. Apparatus for cooling fruit or vegetables or the like, confined in a stack of apertured containers, comprising, in combination: walls forming an enclosure, an upright barrier wall within the enclosure having a series of openings therein, refrigeration means for cooling the enclosure, said means including a fan assembly whereby air may be moved through the said openings, flexible sealing means on said barrier wall encompassing said openings and projecting into said enclosure and shaped for lateral engagement by the stack of apertured containers, air valve means for impeding air flow through said openings and movable to open position permitting air flow through said openings, bias means normally acting to move the air valve means toward closed position, and means operated by engagement with the stack for opening the air valve means against the action of the bias means, whereby air is caused to flow through the apertured containers.

9. The combination set forth in claim 8 wherein the air valve means is mounted on one side of the barrier wall and said flexible sealing means is mounted on the other side of the barrier wall.

10. Apparatus for cooling fruit or vegetables or the like, confined in apertured containers stacked on a pallet, comprising, in combination: walls forming an enclosure, means including an upright barrier wall within the enclosure cooperating with other walls to define a plenum chamber within the enclosure, said barrier wall having a series of openings therein, refrigeration means including a fan assembly and heat exchange elements mounted within the plenum chamber whereby air may be cooled and circulated between plenum chamber and the enclosure, flexible sealing means on said barrier wall encompassing said openings and projecting into said enclosure and shaped for engagement with the apertured containers stacked on the pallet, an air valve device for impeding air flow through said openings and movable to an open position permitting air flow through said openings, and means operated by engagement with the pallet for opening the air valve device, whereby air is caused to flow through the apertured containers.

11. The combination set forth in claim 10 wherein the fan assembly operates to draw air by suction through said apertured containers and then through said openings.

12. The combination set forth in claim 10 wherein the fan assembly operates to blow air through said openings and apertured containers and then into the enclosure.

13. Apparatus for cooling fruit or vegetables or the like, confined in a stack of apertured containers, comprising, in combination: walls forming an enclosure means including an upright barrier wall within the enclosure cooperating with other walls to define a plenum chamber within the enclosure, refrigeration means for cooling the enclosure, said means including a suction fan assembly and heat exchange elements mounted within the plenum chamber whereby air may be cooled as it is circulated between the plenum chamber and the enclosure, said barrier wall having at least one opening therein, flexible sealing means on said barrier wall encompassing said opening and projecting into said enclosure, a combined barometric damper and air valve device movable from a closed position blocking air flow through said opening through an intermediate position to a fully open position permitting substantial air flow through said opening, bias means acting to move said device toward closed position, the suction of the fan acting to lower the air pressure in the plenum chamber to hold the said device in the intermediate position, the stack of apertured containers being laterally engageable with said flexible sealing means, and means operated by engagement with the stack for fully opening the air valve device, whereby air is caused to flow through the apertured containers.

14. Apparatus for cooling fruit or vegetables or the like, confined in a stack of apertured containers, comprising, in combination: walls forming an enclosure, an upright barrier wall within the enclosure and having at least one opening therein, refrigeration means for cooling the enclosure, said means including a fan assembly whereby air may be moved through the said opening, flexible sealing means on said barrier wall encompassing said opening and projecting into said enclosure and shaped for lateral engagement by the stack of apertured containers, air valve means for impeding air flow through said opening and movable to an open position permitting air flow through said opening, and means operated by engagement with the stack for opening the air valve means whereby air is caused to flow through the apertured containers.

References Cited
UNITED STATES PATENTS

| | | | |
|---|---|---|---|
| 3,166,916 | 1/1965 | Burrows | 62—265 |
| 3,178,902 | 4/1965 | Costantini | 62—267 |
| 3,215,059 | 11/1965 | Haas | 62—237 |
| 3,392,543 | 7/1968 | Miller | 62—237 |
| 3,478,535 | 11/1969 | Perez | 62—237 |

WILLIAM J. WYE, Primary Examiner

U.S. Cl. X.R.

62—265, 266, 267